May 28, 1963 W. J. SACKETT, SR 3,091,369
WEIGHING AND MIXING HOPPER
Filed July 19, 1960 5 Sheets-Sheet 1

INVENTOR
WALTER J. SACKETT, SR.

BY Walter G. Finch
ATTORNEY

INVENTOR
WALTER J. SACKETT, SR.

BY Walter G. Finch
ATTORNEY

May 28, 1963  W. J. SACKETT, SR  3,091,369
WEIGHING AND MIXING HOPPER
Filed July 19, 1960  5 Sheets-Sheet 3

WALTER J. SACKETT, SR.
INVENTOR

BY Walter G. Finch
ATTORNEY

May 28, 1963   W. J. SACKETT, SR   3,091,369
WEIGHING AND MIXING HOPPER
Filed July 19, 1960   5 Sheets-Sheet 4

WALTER J. SACKETT, SR.
INVENTOR

BY *Walter G. Finch*
ATTORNEY

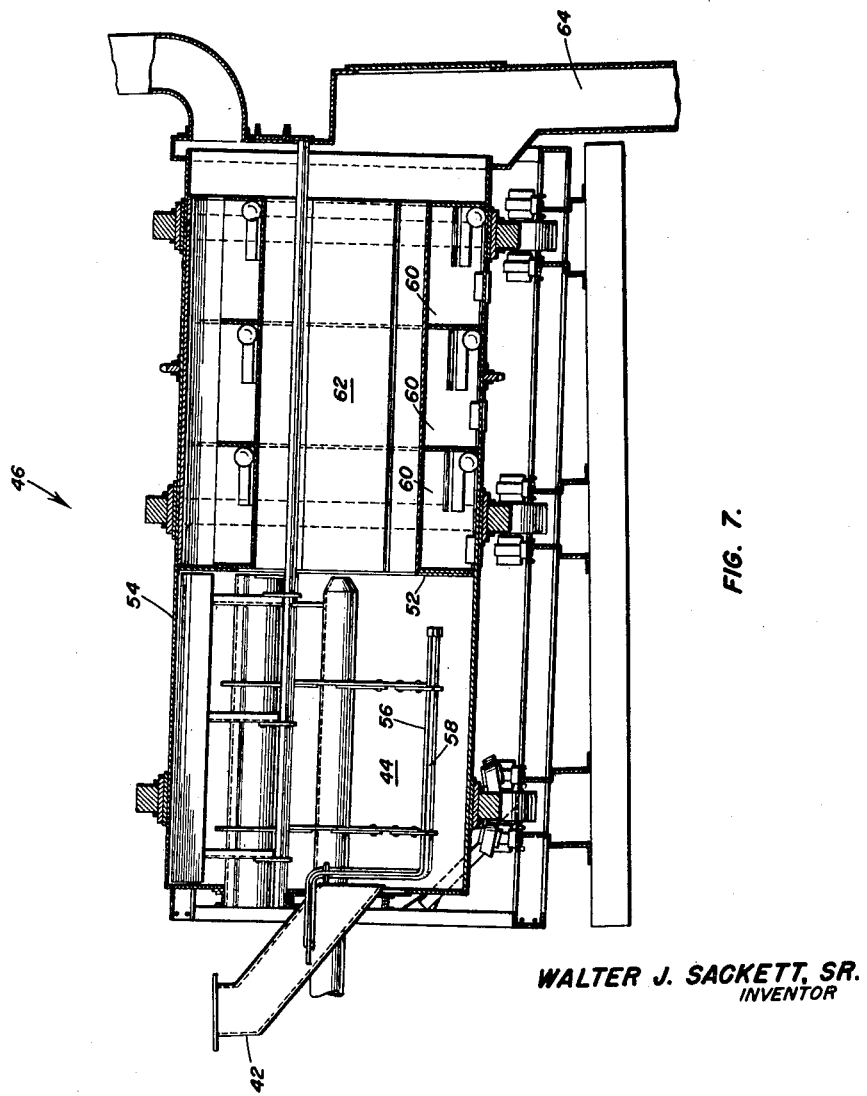

ous ingredients as they are delivered through the air operated valves 26. This weigh hopper 28, whose construction and functions shall be detailed subsequently, is provided with a large pneumatically operated valve 30 for rapid discharge of the ingredients into a supply hopper 32 therebelow.

United States Patent Office 3,091,369
Patented May 28, 1963

3,091,369
WEIGHING AND MIXING HOPPER
Walter J. Sackett, Sr., Baltimore, Md., assignor to The A. J. Sackett & Sons Company, Baltimore, Md., a corporation of Maryland
Filed July 19, 1960, Ser. No. 43,838
3 Claims. (Cl. 222—77)

This invention relates generally to weighing apparatus, and more particularly to a novel weighing and mixing hopper for use in weighing of a plurality of ingredients and the thorough mixing thereof after being weighed.

It is an object of this invention to provide a novel hopper incorporating means for automatically weighing a plurality of ingredients followed by intimate mixing thereof to obtain a uniform mixture of the ingredients.

Still another object of this invention is to provide a new design of a hopper for simultaneously and continuously weighing and mixing of a plurality of ingredients.

And another object of this invention is to provide a unique weighing and mixing hopper which is economical to manufacture, efficient and reliable in operational use, which is automatic, and easy to install, maintain, and operate.

These and other objects and advantages of this invention will become more readily apparent from the following detailed description and accompanying drawings in which:

FIG. 7 is an axial cross-section through a preferred form of a combined ammoniator-granulator apparatus for use in the process of the present invention.

Figure 1:
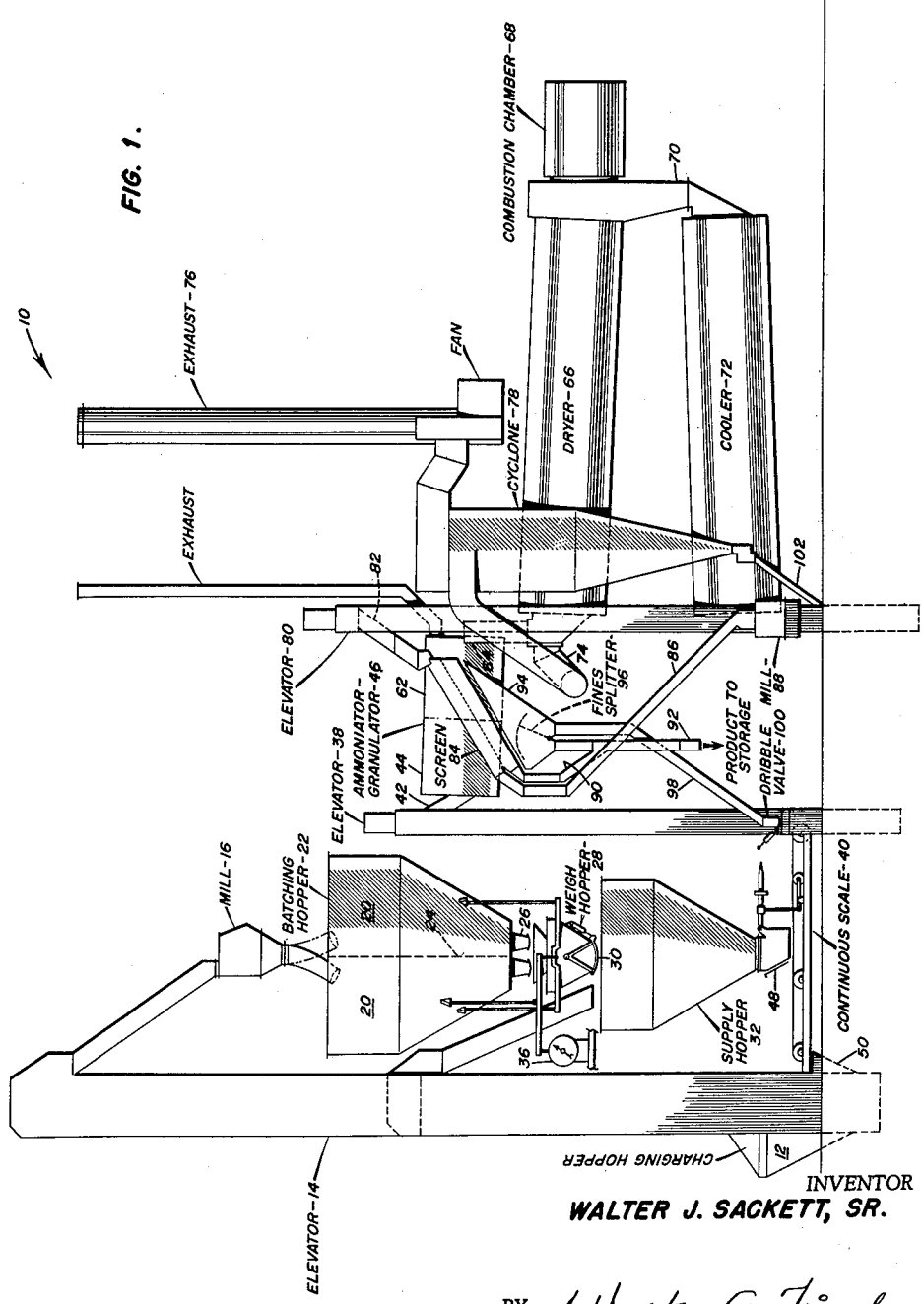
FIG. 1 is a generally diagrammatic illustration of the various components of the apparatus of the present invention incorporating novel features thereof.

Referring first to FIG. 1 of the drawings, there is shown a plant 10 arranged for the manufacture of granular mixed goods, such as plant foods, fertilizer, or the like. Various unweighed bulk ingredients are delivered, by payloaders or the like, to a charging hopper 12 from which they are conveyed by a steel cased bucket elevator 14 to an elevated mill 16 whose function it is to reduce any oversize materials.

The materials are then guided by a chute into one or a plurality of compartments 20 which are arranged within the batching hopper 22. The batching or storage hopper 22 is preferably made of heavy steel plate construction and can be provided with segmental partitions 24 to accommodate up to eight ingredients.

The particular hopper 22 disclosed in FIG. 1 is divided into four compartments 20, each of which is equipped with a pneumatically operated cut-off valve 26 at the bottom of the hopper 22.

Directly beneath the batching hopper 22, and suspended therefrom, is a weigh hopper 28 which receives the various ingredients as they are delivered through the air operated valves 26. This weigh hopper 28, whose construction and functions shall be detailed subsequently, is provided with a large pneumatically operated valve 30 for rapid discharge of the ingredients into a supply hopper 32 therebelow.

Figure 2:
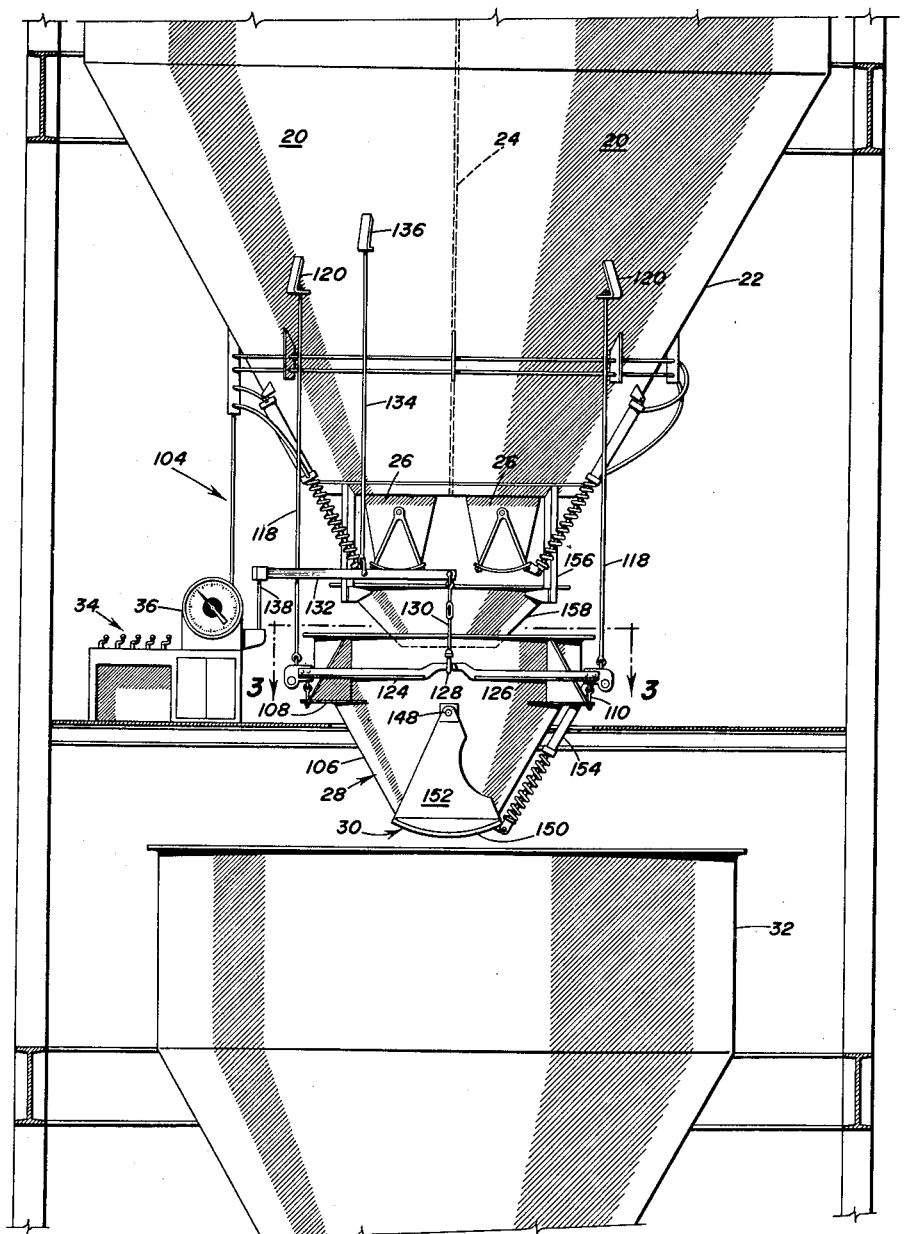
FIG. 2 is an elevation of a hopper whose function it is to weigh and mix the various materials comprising the fertilizers to be produced by the process and apparatus of the present invention.

The weighing of the various ingredients as well as the discharge of a completed batch is accomplished from a central control console 34 located directly in front of a scale dial 36 as shown best in FIG. 2. The scale furnished with this system is equipped with a recording device which will prove a daily printed record of the batch weighing accomplished during an operating period.

Upon completion of weighing of the component ingredients, the batch becomes thoroughly mixed upon discharging from the weigh hopper 28 into the supply hopper 32. The mixed solid ingredients are then transferred from hopper 32 to a second elevator 38 by means of a self-compensating type continuous weighing machine 40.

This machine 40 supplies an accurately controlled flow of the blended solid ingredients by elevator 38 and chute 42 to the ammoniating section 44 of a combination ammoniator-granulator 46.

Before proceeding further, it should be explained that quite frequently upon completion of any operating period, a considerable amount of the various ingredients will more than likely remain within the compartments 20 of batching hopper 22. If the ingredients are allowed to remain overnight they may, when sufficient humidity exists, tend to lump thereby becoming unsuitable for accurate weighing purposes.

In such an instance, the valve 26 to a compartment 20 will be opened and its material will pass directly through weigh hopper 30 into supply hopper 32 from which it will exit through a rear trap 48 onto the continuous scale 40, the motion of whose belt has been reversed.

The belt will then return the unsuitable material to a rear hopper 50 from which it will be returned by elevator 14 to the mill 16. The mill 16 will restore the material to proper size after which it can be returned to its particular compartment 20. The above step will, of course, be repeated for as many materials as are stored with the batching hopper 22.

To continue, the fertilizer ingredients are fed at a constant rate through chute 42 into the ammoniator section 44 of the combined ammoniator-granulator 46 wherein a bed of the ingredients will build up against a dividing ring 52, shown best in FIG. 7. As drum 54 of the ammoniator-granulator 46 rotates, the ingredients in ammoniator section 44 are tumbled over and around pipes 56 and 58 through which are introduced metered flows of ammonia and acid respectively, with a resultant thorough mixing of the constituents.

As the bed of ammoniated and acidulated material builds up it begins to flow over the dividing ring 52 of the ammoniator-granulator into the first of a plurality of adjacent tumbling compartments 60 within a granulator section 62 of the ammoniator-granulator 46. As the drum 54 continues to rotate, depending upon how full each compartment 60 may be and further depending upon the fluidity of the mixture, the mixture will flow from one compartment 60 to the next adjacent compartment.

Heated air from the ammoniating reaction is drawn lengthwise of the drum 54 toward the exhaust port. It is replaced by cool dry air which is drawn through the inlet chute 42 with the incoming materials, and which is then passed over the reacting materials in the ammoniating process. The hot air surface hardens the granules which are being formed from the mixture as it cascades from compartment to compartment and rolls over the various surfaces. A fully detailed understanding of the construction and functions of the ammoniator-granulator 46 may be had from an examination of my copending U.S. patent application S.N. 715,648 filed February 17, 1958, now Patent No. 3,022,142.

Upon completion of the ammoniation-granulation phase in the ammoniator-granulator 46, the spherical granules, or pellets are fed through chute 64 to a gas or oil-fired direct heat rotary dryer 66 shown in FIG. 1 which is provided with a refractory lined combustion chamber 68. Granules from the dryer 66 then pass through a chute 70 into a rotary cooler 72 where they are cooled by a counter-current air flow. Moisture from both the dryer 66 and the cooler 72 is exhausted to atmosphere through a duct 74 and a stack 76. A cyclone 78 recovers fine dust through duct 74 from both the dryer 66 and cooler 72.

The treated material is next discharged from the cooler 72 into a third elevator 80 which conveys it through a chute 82 to a double deck classifying screen 84. This particular screen 84 sorts the material into three classifications, namely, oversize, finished product, and fines. The oversize granules are passed through a duct 86 to a mill 88. The crushed oversize granules are then returned for reclassification through elevator 80 and duct 82 to the screen 84. The finished product is transported to storage through chutes 90 and 92.

The fines passing through screen 84 enter a hopper 94 which is provided with a fines splitter or valve gate 96. The splitter 96 for the fines can be adjusted to a setting which will direct an acceptable portion of the fines into the product stream to storage through chute 92. The remainder of the fines will be returned for reprocessing through a chute 98 to an adjustable dribble valve 100 which will slowly allow the rejected fines to combine with the virgin mixture being conveyed by elevator 38 to the ammoniator-granulator 46.

Those fines which have been recovered by cyclone 78 from the dryer 66 and cooler 72 will pass through a chute 102 and elevator 80 to the classifying screen 84 from which they are directed to reprocessing as described above.

Figure 3:
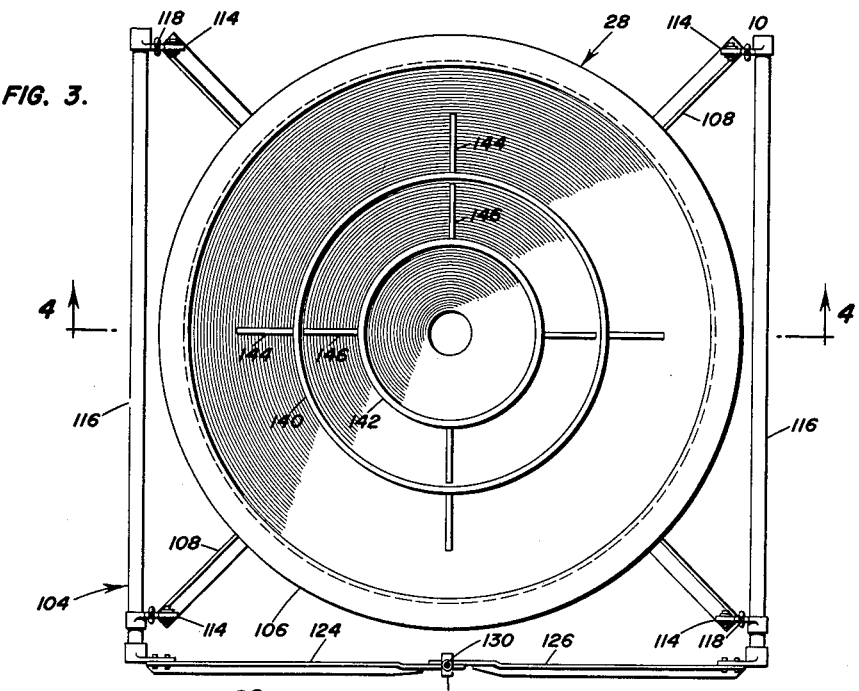
FIG. 3 is a horizontal section, on an enlarged scale, taken along line 3—3 of FIG. 2.
Figure 4:
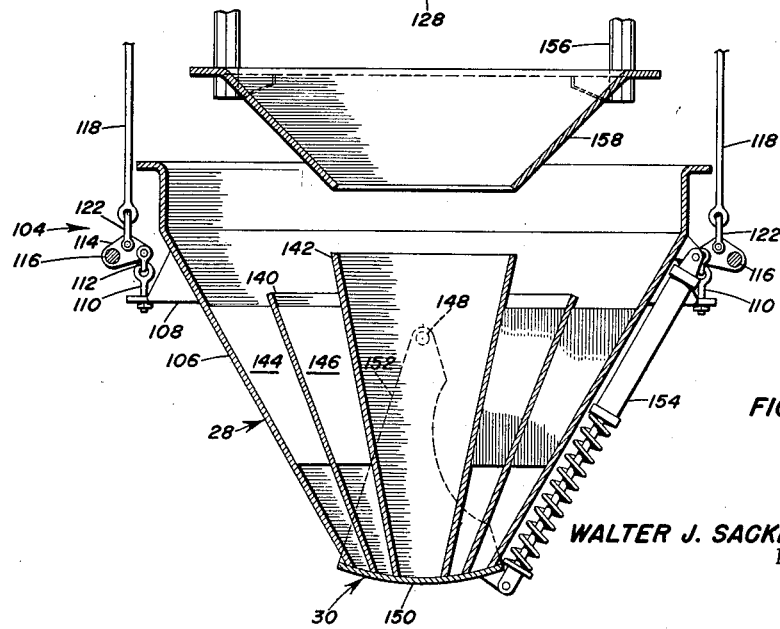
FIG. 4 is a cross-section taken along line 4—4 of FIG. 3.

FIGURES 2, 3, and 4 disclose in detail the construction of the novel weighing and mixing hopper 28 of the present invention and a generally typical method of arranging the hopper for use with a suspended scale system 104. The hopper 28 includes a conical main body 106 to which are welded in cruciform arrangement, four triangular suspension gussets 108.

As best illustrated in FIGS. 3 and 4, each gusset 108 depends by means of eyebolts 110 and shackles 112 from a short fulcrum 114. Each fulcrum 114 is fixed to one end of a pair of torque shafts 116.

The entire preceding arrangement, in turn, is suspended by rods 118 whose upper ends are secured to brackets 120 on batching hopper 22, and the lower ends of which are secured by shackles 122 to the fulcrums 114 at a point approximately midway between the torque shaft 116 and its shackle 112.

As the scale hopper 28 is being loaded, fulcrums 114 will rotate the torque shafts 116 which then will drive a left hand lever 124 and a right hand lever 126 through short clockwise and counter clockwise arcs, respectively.

A portion of the load being weighed is thus applied by the inner ends of levers 124 and 126 to a knife edge 128 which is suspended by an adjustable rod 130 from one end of a balanced rocking lever 132. The lever 132 is suspended at its midpoint by a rod 134, the upper end of which is secured to a bracket 136 on hopper 22. The remaining end of the rocking lever 132 drives a steelyard rod 138 to actuate the scale 36.

A pair of truncated cones 140 and 142 are concentrically arranged and secured within the hopper body 106 by webs 144 and 146, respectively. As best illustrated in FIG. 4 the body 106 and the cones 140 and 142 have their lower ends, or apexes, cut away to form an arc struck about the axis of a hinge boss 148 located on body 106.

The discharge valve 30 is arranged with an arcuate closure plate 150 which is secured to a pair of generally triangular legs 152 that are mounted for rotation on boss 148. The advantages of such an arrangement over a bottom hinged trap are several. The more important of which are that the need for a latch is eliminated due to the fact that the load is balanced. In addition, there is the elimination of any necessity for the actuating cylinder to assist in supporting the load thereby allowing the use of a considerably lighter actuating cylinder 154. And, finally, there is a considerable saving in vertical space which would be required by a drop type trap door.

Immediately below the batching hopper 22, a shallow cone 158 is suspended by legs 156 whose function it is to center the various ingredients as they are discharged through valves 26, from their respective compartments 20.

Figure 5:
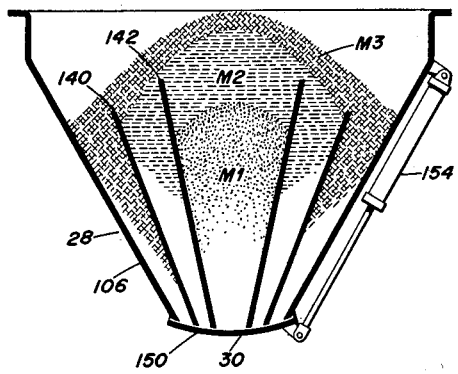
FIG. 5 is a somewhat diagrammatic cross-section taken through the mixing and weighing hopper detailed in FIGS. 2, 3, and 4, and illustrates the manner in which various materials become arranged during the weighing step of the apparatus of the present invention.
Figure 6:
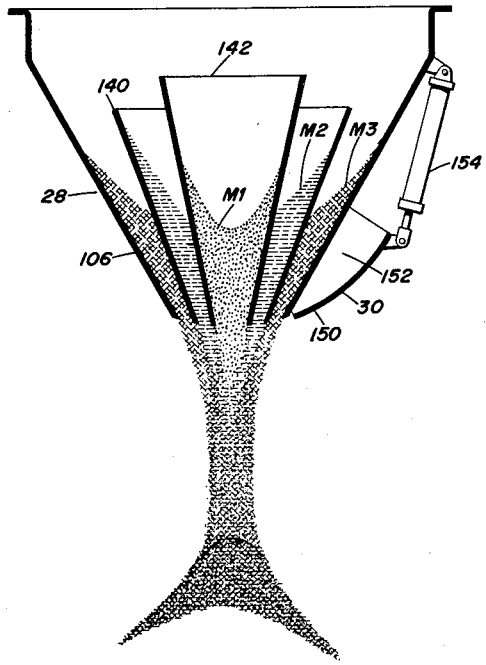
FIG. 6 is a further diagrammatic cross-section similar to FIG. 5 but showing the manner in which the weighed materials are blended upon release from the hopper.

A clear understanding of the manner in which the various ingredients are caused to become thoroughly mixed can be had from an examination of FIGS. 5 and 6. As shown in FIG. 5, a first ingredient M1 (stipple shading) will be deposited within cone 142 during weighing. A second ingredient M2 (horizontal dotted lines) to be weighed will fill the remaining space in cone 142 and then flow over into cone 140. A third ingredient M3 (double cross hatch shading) will cover the surface of the preceding ingredient and then flow over into the main hopper body 106. As shown in FIG. 6, when the valve 30 is swung open, the openings of all the cones 28, 140, and 142 will be exposed almost simultaneously thereby permitting the various ingredients M1, M2, M3 to discharge simultaneously and intermix as they drop into the supply hopper 32. While three ingredients are above indicated, actually any number of different materials can be used with this unit.

Obviously many modifications and variations of the present invention are possible in light of the above teachings. It is, therefore, to be understood that within the scope of the appended claims the invention may be practiced otherwise than as specifically described.

What is claimed is:

1. A weighing and mixing hopper arrangement for automatically weighing and mixing a plurality of ingredients, comprising, structure defining a weighing hopper having a plurality of coaxially arranged inverted truncated shaped open-ended cones defining chambers therebetween for successively receiving said plurality of ingredients, said cones having their upper ends spaced longitudinally from each other and their lower ends terminating substantially in a common arcuate surface, discharge valve means including a pivotally mounted arcuate shaped closure member for closing off all the lower ends of said cones so that said chambers can receive ingredients from above, with said cones being so arranged that the innermost cone when filled will spill ingredients therefrom over into the next outermost cone and successively to adjacent outer cones when ingredients are fed thereto, fulcrum means for suspending said weighing hopper at spaced intervals around the outer periphery thereof, and scale means coupled to said fulcrum means for weighing the ingredients of said cones the structure being such that when said arcuate closure member is withdrawn, said ingredients are discharged simultaneously and substantially in separate coaxial columns from said chambers and intermixed in a common discharge column therebelow.

2. A weighing and mixing hopper arrangement as recited in claim 1, wherein the upper end of said innermost cone is elevated above the upper end of the adjacent next outermost cone.

3. A weighing and mixing hopper arrangement as recited in claim 1, wherein the lower ends of said cones are concentrically arranged and vary in discharge area.

References Cited in the file of this patent

UNITED STATES PATENTS

| | | |
|---|---|---|
| 1,878,874 | McBride | Sept. 20, 1932 |
| 2,138,172 | Johnson | Nov. 29, 1938 |
| 2,455,572 | Evans | Dec. 7, 1948 |
| 2,527,147 | Noble | Oct. 24, 1950 |
| 2,608,394 | Williamson | Aug. 26, 1952 |

FOREIGN PATENTS

| | | |
|---|---|---|
| 255,331 | Germany | Nov. 3, 1911 |